United States Patent [19]

Hasegawa

[11] Patent Number: 4,769,838
[45] Date of Patent: Sep. 6, 1988

[54] COMMUNITY ANTENNA TELEVISION RECEPTION CONTROLLING APPARATUS

[75] Inventor: Yonosuke Hasegawa, Tokyo, Japan

[73] Assignee: Pioneer Electronic Corporation, Tokyo, Japan

[21] Appl. No.: 807,009

[22] Filed: Dec. 9, 1985

[30] Foreign Application Priority Data

Dec. 10, 1984 [JP] Japan .................. 59-260502

[51] Int. Cl.$^4$ ............ H04N 7/167; H04K 3/00; H04H 1/00
[52] U.S. Cl. ............................. 380/7; 380/20; 455/1; 455/4; 358/86
[58] Field of Search ............ 358/118, 114, 122, 86, 358/84; 455/1, 3, 4, 6; 380/7, 10, 20

[56] References Cited

U.S. PATENT DOCUMENTS

| | | | |
|---|---|---|---|
| 4,091,413 | 5/1978 | Herman | 380/7 |
| 4,222,067 | 9/1980 | Stern et al. | 380/7 |
| 4,434,436 | 2/1984 | Kleykamp et al. | 380/7 |
| 4,450,481 | 5/1984 | Dickinson | 380/7 |
| 4,521,809 | 6/1985 | Bingham | 358/118 |
| 4,550,341 | 10/1985 | Naito | 358/118 |
| 4,598,312 | 7/1986 | Geissler | 358/118 |
| 4,651,204 | 3/1987 | Uemura | 380/20 |
| 4,682,359 | 7/1987 | Mistry | 380/7 |

Primary Examiner—Stephen C. Buczinski
Assistant Examiner—Linda J. Wallace
Attorney, Agent, or Firm—Sughrue, Mion, Zinn, Macpeak & Seas

[57] ABSTRACT

A reception controlling apparatus for a CATV system in which jamming signals are added to the signals sent to each subscriber's terminal unit in such a manner as to accurately jam the designated nonpermitted channels without interfering with the permitted channels. A microcomputer receives data from a broadcast center indicating which subscribers are permitted to view which channels. A jamming signal is generated in a time-division manner and gated onto the lines to the individual subscribers under the control of the microcomputer. The jamming signal is produced by a VCO controlled by the microcomputer. The jamming signal is produced by a VCO controlled by the microcomputer while providing correction to its output frequency.

8 Claims, 7 Drawing Sheets

FIG. 7

ROM

| ADR 1 |
| ADR 2 |
| ADR 3 |
| |
| ADR i |
| f₁ COUNT |
| f₂ COUNT |
| f₃ COUNT |
| |
| fⱼ COUNT |
| |
| D/A CON |

A

RAM

| CMP 1M |
| CMP 1L |
| CMP 2M |
| CMP 2L |
| CMP 3M |
| CMP 3L |
| |
| CMP kM |
| CMP kL |
| CH E/D 1 |
| CH E/D 2 |
| CH E/D 3 |
| |
| CH E/D i |

B

COMMUNITY ANTENNA TELEVISION RECEPTION CONTROLLING APPARATUS

BACKGROUND OF THE INVENTION

The present invention relates generally to reception control with respect to chargeable channels in a community antenna television (hereinafter abbreviated to CATV) system, and particularly to a system for mixing jamming signals into CATV signals in frequency bands of channels which are not permitted to be viewed (hereinafter simply referred unpermitted channels) so as to scramble the CATV signals in the specified channels in subscriber side CATV signal distributing systems.

Conventionally, a CATV system can be used for providing changeable programs for subscribers, and various systems have been realized to prevent viewing of unpermitted channels. Here, the term "chargeable program" means reception of a specified channel determined on the basis of a contract for an individual subscriber beyond the basic service determined by the contract with the subscriber.

The simplest arrangement to prevent a person from unauthorized viewing of chargeable programs is one in which a frequency converter for the CATV signal is provided at each subscriber's terminal for converting the frequency band of the CATV signal into that of a VHF channel so that the CATV signal can be received by a TV set, wherein a band-elimination filter is provided in the coaxial cable leading to the subscriber's terminal for preventing the subscriber from receiving channels other than the contracted ones.

In this system, however, there have been such disadvantages that it is necessary to change the band elimination filter (hereinafter referred to as a trap) every time there occurs a change in the contracted channels, resulting in a considerable cost. Also, the number of traps which can be used at any one location is limited so that the number of the changeable channels is limited correspondingly.

In order to eliminate these disadvantages, addressable subscribers' terminals have been used. The arrangement of such a terminal will be described hereunder.

In this system, each subscriber's terminal is subject to polling by the program broadcasting station (hereinafter referred to as a center), wherein an address stored in advance in the terminal is compared with a polling address. If the two values coincide, viewing is allowed. Hence, reception control can be performed by data communications from the center. The subscriber terminal is therefore provided with a demodulator and a microprocessor for reading and processing the received data.

Further, with respect to the chargeable programs, a method has been employed whereby the CATV signal of a chargeable program is scrambled in advance at the center, and a control signal in a special CATV channel is descrambled at the subscriber's terminal. Typically, in such a channel scrambling system, horizontal synchronizing signals of the scrambled TV signal are eliminated at the center so that it is difficult to perform synchronized reproduction at an unauthorized viewer's TV set. Accordingly, it is necessary to restore the synchronizing signals for subscribers authorized to receive such signals, and therefore it is required to provide a descrambler and a demodulator for receiving data for controlling the descrambler and the demodulator at the subscriber's terminal.

In the conventional unauthorized viewing preventing systems described above, it is necessary to provide a descrambler and a demodulator for data communication at each subscriber's terminal, and hence such systems are expensive. Further, there have been disadvantages in that the quality of the received picture is deteriorated in the scrambling and descrambling process. Moreover there is still a possibility for an unauthorized subscriber to receive chargeable programs by reconstructing the terminal.

Further, in consideration of the foregoing disadvantages, there has been proposed an unauthorized viewing preventing system in which time-division type jamming signals for the chargeable channels are produced at various distribution points in the system, which jamming signals are selectively supplied to CATV signals in unauthorized channels.

In such a system in which jamming signals are applied to the chargeable channel signals and mixed therewith for jamming purposes, it has generally been the practice to provide the jamming signals using one or more voltage-controlled oscillators (VCOs) and phase-locked loops. The voltage-controlled oscillators are periodically stepped through the frequencies of the various CATV channel signals to be jammed. That is, the jamming signals are provided on a time-divisional basis.

In order to provide effective jamming, it is necessary that the jamming signal not only be of a sufficient amplitude, but it must also have a sufficient repetition period and accuracy of frequency so as to disturb the horizontal and vertical synchronizing signals to the extent that it is impossible to receive an unauthorized channel. However, it has been found difficult to attain this using conventional circuitry in that the lock-in time and synchronizing time of the phase-locked loop is not negligible. Accordingly, the level of the scrambling function or the number of channels which can be scrambled in this manner is limited.

Further, in order to provide a phase-locked loop system which can operate at a high-speed, it is necessary to employ as a reference signal a signal of a high-frequency. This makes the circuitry expensive.

Still further, if a jamming signal generator of this type is provided for every channel, the overall system cost is quite high. Moreover, using conventional circuitry, the output frequency of the voltage-controlled oscillator tends to vary outside the band of the signal to be jammed prior to lock-in. This causes an unwanted influence in channels which are not to be scrambled. Yet further, it has proven difficult to control the change over switch used to control jamming signal mixing operations.

SUMMARY OF THE INVENTION

Accordingly, an object of the present invention is to provide a reception control system in which the foregoing disadvantages have been eliminated.

Still further, it is an object of the present invention to provide such a reception control system having a compact size and which is economical to construct and operate.

In accordance with these and other objects of the invention, there is provided a CATV reception controlling system comprising a branching device for branching a CATV signal from a transmission line to a plurality of subscriber terminals, a plurality of directional couplers for applying a jamming signal in a time-divisional manner to individual subscriber branch lines, a plurality of switches for controlling the application of the jamming signal to and from the directional couplers, computer means for controlling operations of the switches in a time-divisional manner in response to program controlling data received from a center, a voltage-controlled oscillator for generating the jamming signal, a digital-to-analog converter for generating a voltage for controlling the frequency of the output of the voltage-controlled oscillator in response to digital data from the computer means, and a counter for periodically counting the output signal of the voltage-controlled oscillator during a predetermined period of time, the computer means also reading out a count value produced from the counter and supplying the digital-to-analog converter with a digital output.

BRIEF DESCRIPTION OF THE DRAWINGS

FIG. 7 shows memory maps of respective ROM and RAM storage devices in the CATV signal distribution system of the invention.

DESCRIPTION OF THE PREFERRED EMBODIMENTS

Figure 1:
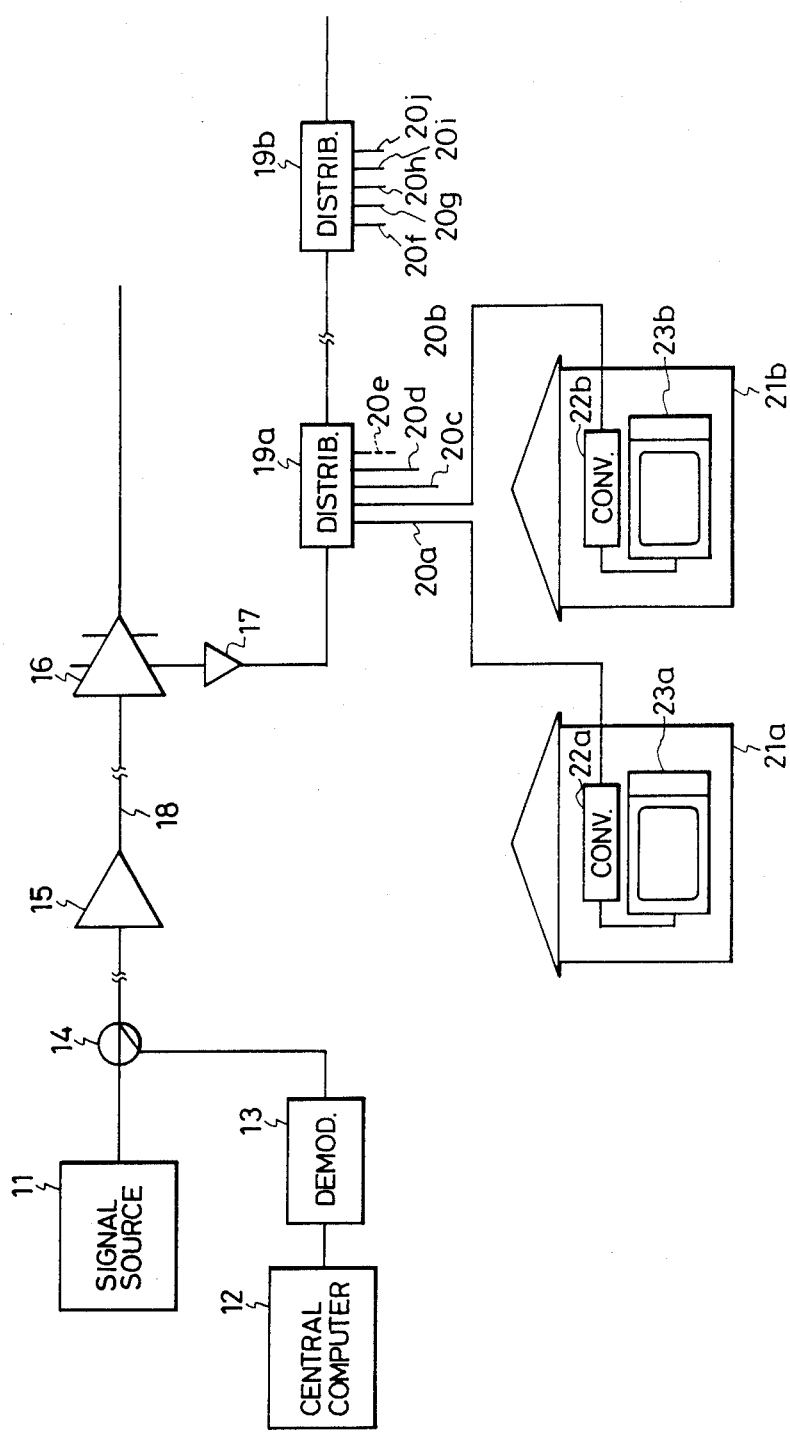
FIG. 1 is a schematic block diagram showing a CATV system in which the present invention is employed.

Referring to the drawings, preferred embodiments of the present invention will now be described.

FIG. 1 shows an example of a CATV signal distributing system of the present invention. In this drawing, a signal source 11 sends out a video signal and an audio signal with a predetermined frequency interval therebetween. A central computer 12 is provided which performs polling operations so as to control the permission/nonpermission of reception of particular channels on the basis of stored data. A modem (modulator/demodulator) 13 modulates the polling signal provided by the central computer 12 with an RF signal. Further in FIG. 1, reference numeral 14 designates a signal coupler; 15, a trunk line amplifier; 16, a branch line amplifier; 17, an extension amplifier; 19a and 19b, signal distributors (embodying particular features of the invention); 20a to 20j, individual subscriber drop lines; 21a and 21b, subscribers premises; 22a and 22b, CATV converters; and 23a and 23b, TV sets.

Figure 2:
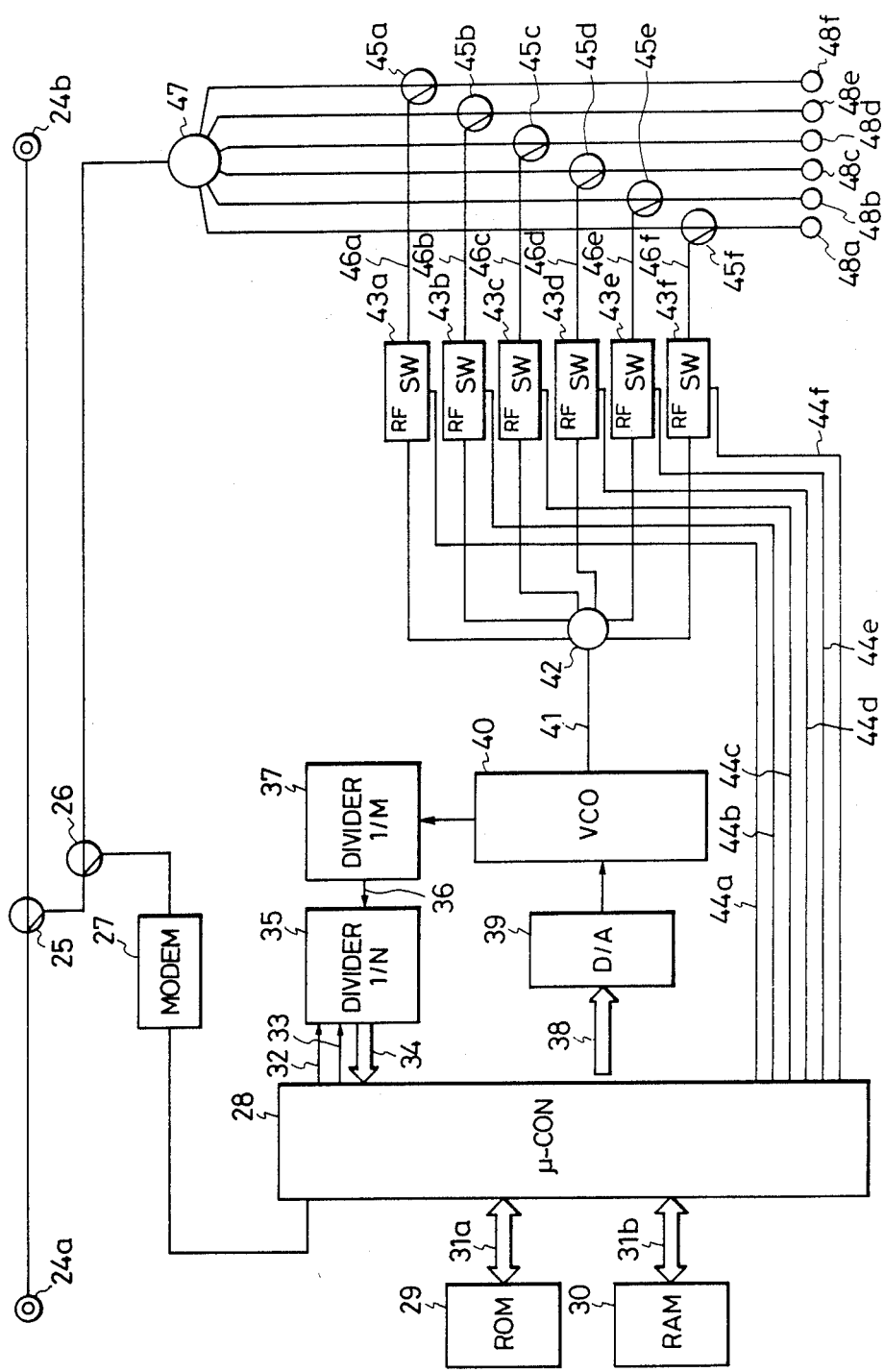
FIG. 2 is a block diagram showing a preferred embodiment of a CATV distributing system constructed according to the present invention.

FIG. 2 is a block diagram of one of the distributors 19a and 19b. In FIG. 2, connectors 24a and 24b are connected to the output line extending from the amplifier 17. Branching devices 25 and 25 branch the signal on the line from the output of the amplifier 17. A modem 27 demodulates the data received from a broadcast center, which data is generated in accordance with a polling system.

Further in FIG. 2, reference numeral 28 designates a microcomputer; 29, a ROM for storing polling addresses corresponding to respective subscribers and frequency selection data for generating jamming signals; and 30, a RAM for storing data generated in accordance with the contracts with the individual subscribers indicating which channels are chargeable for the respective subscribers. The ROM 29 and the RAM 30 are connected to the microcomputer 28 via address and data busses 31a and 31b, respectively. A VCO 40 is provided for generating a jamming signal. A D/A converter 39 supplies the VCO 40 with a voltage corresponding to a frequency to be generated at given instants. Reference numeral 38 designates a data bus used for supplying the D/A converter with data indicative of the voltage to be generated, this data being outputted by the microcomputer 28.

A frequency divider 37 divides the frequency of the output signal produced by the VCO 40 by a factor of 1/M, the divider 37 acting as a prescaler for converting an RF level into a logic signal. Reference numeral 36 designates the output of the divider 37. A binary n-bit counter 37 supplies its output to the microcomputer 28. Reference numerals 32 and 33 designate signals produced by the microcomputer 28 for controlling the resetting of and enabling/disabling of the counter 35. A distributor 42 distributes a jamming signal 41 produced by the VCO 40 to respective input terminals of RF switches 43a to 43f. Control signal lines 44a to 44f carry signals which control the positions (on/off) of the respective RF switches 43a to 43f in response to instructions received from the microcomputer 28, specifically, in response to the data indicative of which channels are allowed to be viewed by which subscribers. Accordingly, a jamming signal 41 is generated by the VCO 40 and supplied to subscriber output terminals 48a to 48f as determined by the states of the various RF switches 43a to 43f.

Branching devices (directional couplers 45a to 45f) are connected to a branching unit 47 for receiving signals from the respective RF switches 43a to 43f. A jammed (composite) signal, having a frequency spectrum determined in accordance with the CATV signal obtained by combining the signals at the outputs of the branching device 47 and the jamming signal at the outputs of the RF switches 43a to 43f, is supplied to each of the subscriber output terminals 48a to 48f.

As described above, the jamming signal acts on the synchronizing signals applied to the various subscribers' TV sets and, accordingly, on the AGC levels of the sets, so as to prevent unauthorized reception of unpermitted channels. However, it is well-known that noise elimination circuitry is ordinarily provided in each TV set to reduce the level of noise contained in the video output, particularly, to eliminate noise having levels exceeding a predetermined value relative to the level of the synchronizing signals. Therefore, in order to effectively jam the CATV signals, it is necessary to maintain the amplitude of the jamming signals at a fixed amplitude level relative to the ordinary TV signals.

As a result of experiments, it has been determined that the most effective results can be obtained where the level of the jamming signal is set to an amplitude larger by about 5 to 10 dB than the video signal in a given channel. Further, since the amplitude of the CATV signal can vary depending on the characteristics of the line amplifiers and/or the frequency characteristics of the coaxial cables of the CATV system, it is desirable to vary the level of the jamming signal in accordance with the variations in amplitude of the ordinary CATV signals.

Figure 3:
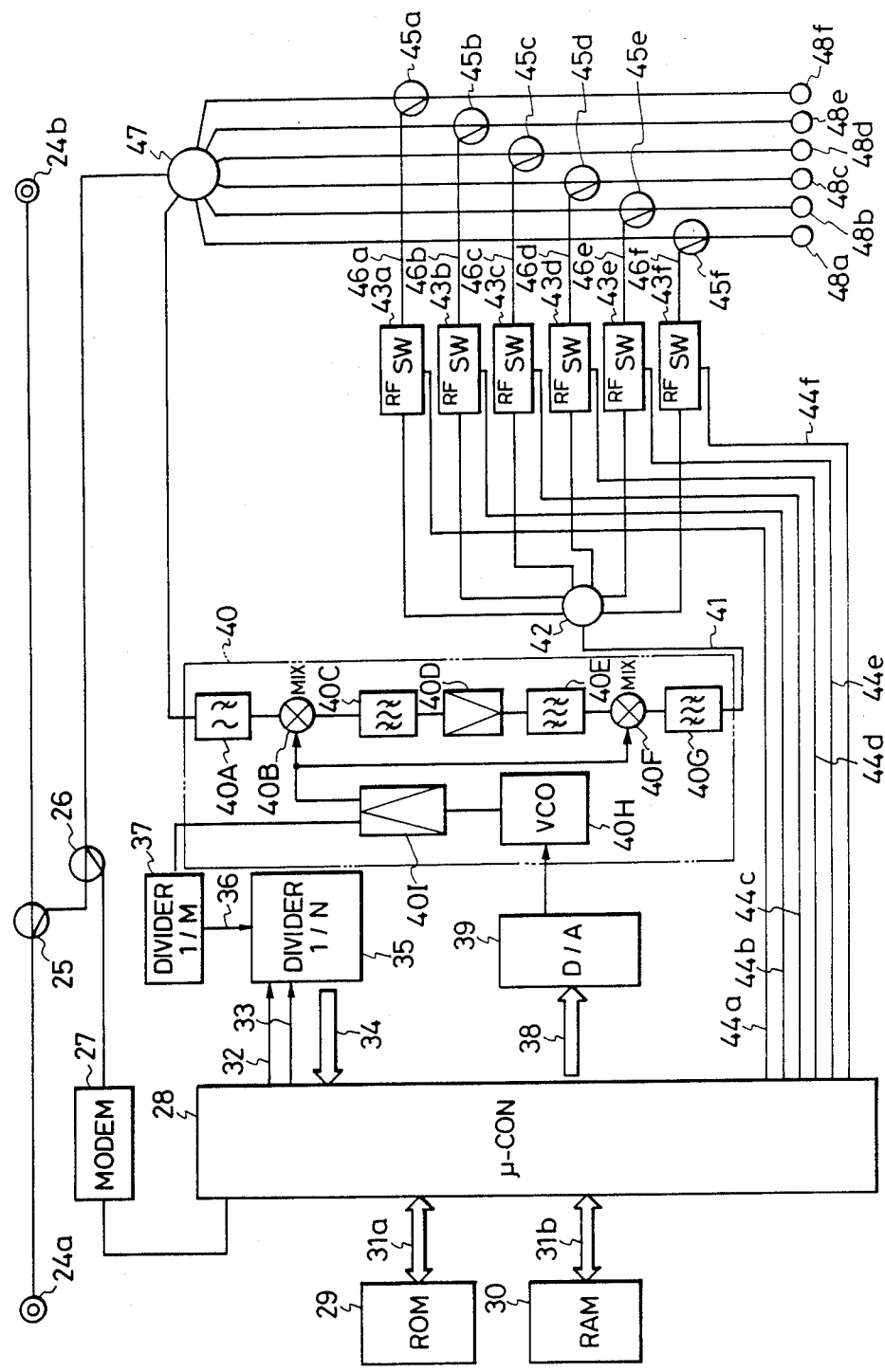
FIG. 3 is a block diagram showing another embodiment of a CATV signal distributing system of the present invention.

FIG. 3 is a block diagram showing another embodiment of a jamming signal generating system of the present invention in which such an amplitude-following function is provided. The system of FIG. 3 is generally similar to that of FIG. 2. However, in the FIG. 3 embodiment, not only is the frequency of the jamming signal controlled in the same manner as described above with respect to the FIG. 2 embodiment, but also the amplitude of the jamming signal is made to follow the amplitude variations in the CATV signal so that an optimum jamming signal level is continuously maintained. In FIG. 3, elements corresponding to those in the embodiment of FIG. 2 are designated by like reference numerals.

In FIG. 3, a VCO 40 for generating the jamming signal is provided with a VCO unit 40H connected to a D/A converter 39, a first mixer 40B connected to a distributor 47 through a low-pass filter (LPF) 40A and to the VCO unit 40H through an amplifier 40I. Thereby, the output of the VCO unit 40H is mixed with a CATV signal obtained from the branching signal 47. The frequency of the output signal of the VCO unit 40H is controlled by the output voltage level from the D/A converter 39 so as to cause the output frequency of the mixer 40B of the channel to be jammed tp be an intermediate frequency $f_L = f_j + f_v$, where $f_j$ and $f_v$ respectively represent the frequency of the output signal of the VCO unit 40H and the frequency of the CATV signal of the specific channel to be jammed.

The VCO 40 is further provided with intermediate frequency bandpass filters (BPFs) 40C, 40A and 40J, an intermediate frequency amplifier 40D, and a second mixer 40F for thereby producing outputs signals having frequencies $f_L - f_j$ and $f_L + f_j$. Accordingly, an output signal having a frequency $f_v = f_L - f_j$ is derived at the output of the BPF 40G. That is, a jamming signal having a level equivalent to that of the CATV signal to be jammed is produced at the output of the BPF 40G. The amplitude level of this jamming signal is maintained at a fixed ratio relative to the level of the CATV signal being jammed. Further, the jamming signal jams both the audio carrier $f_v$ as well as the audio carrier $f_a$ so that scrambling is effected to both the picture and sound.

Figure 4:
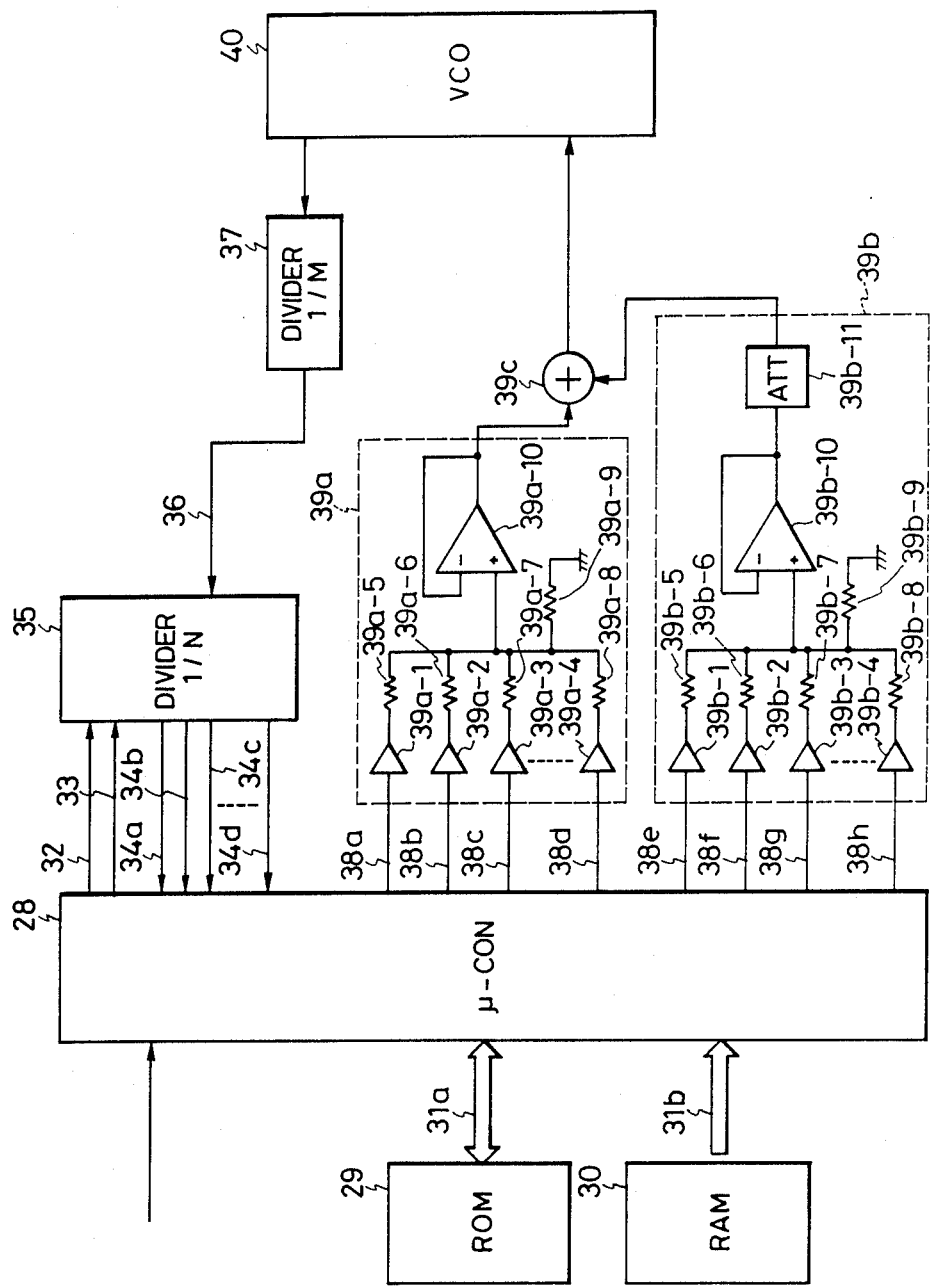
FIG. 4 is a connection diagram provided for explaining a jamming signal generating system using a D/A converter and a VCO and constructed in accordance with a particular feature of the present invention.

FIG. 4 shows an embodiment of the VCO controlling section. Features of the VCO controlling section enable the jamming signal generating apparatus of the invention to operate at a high speed and yet allow the overall system to be implemented at a low cost. In FIG. 4, elements seen also in FIGS. 2 and 3 are correspondingly designated.

In FIG. 4, D/A converter units 39a and 39b, and an adder 39c constitute a D/A converter section used for controlling the VCO. The D/A converter unit 39a is constituted by CMOS logic gates 39a-1 to 39a-4, resistors 39a-5 to 39a-9, and an operational amplifier 39a-10. Similar to the D/A converter unit 39a, the D/A converter unit 39b is constituted by CMOS logic gates 39b-1 to 39b-4, resistors 39b-5 to 39b-9, an operational amplifier 39b-10, and further an additional resistive attenuator 39b-11.

Assuming that each of the D/A converter units 39a and 39b has a digital input of n bits, and if the resistance value of the attenuator 39b-11 is set so that half the LSB of the D/A converter unit 39a is equal to the MSB of the D/A converter unit 39b, a simple D/A converter section of 2n bits is provided. The adder 39c sums the outputs of the respective D/A converter units 39a and 39b.

Figure 5:
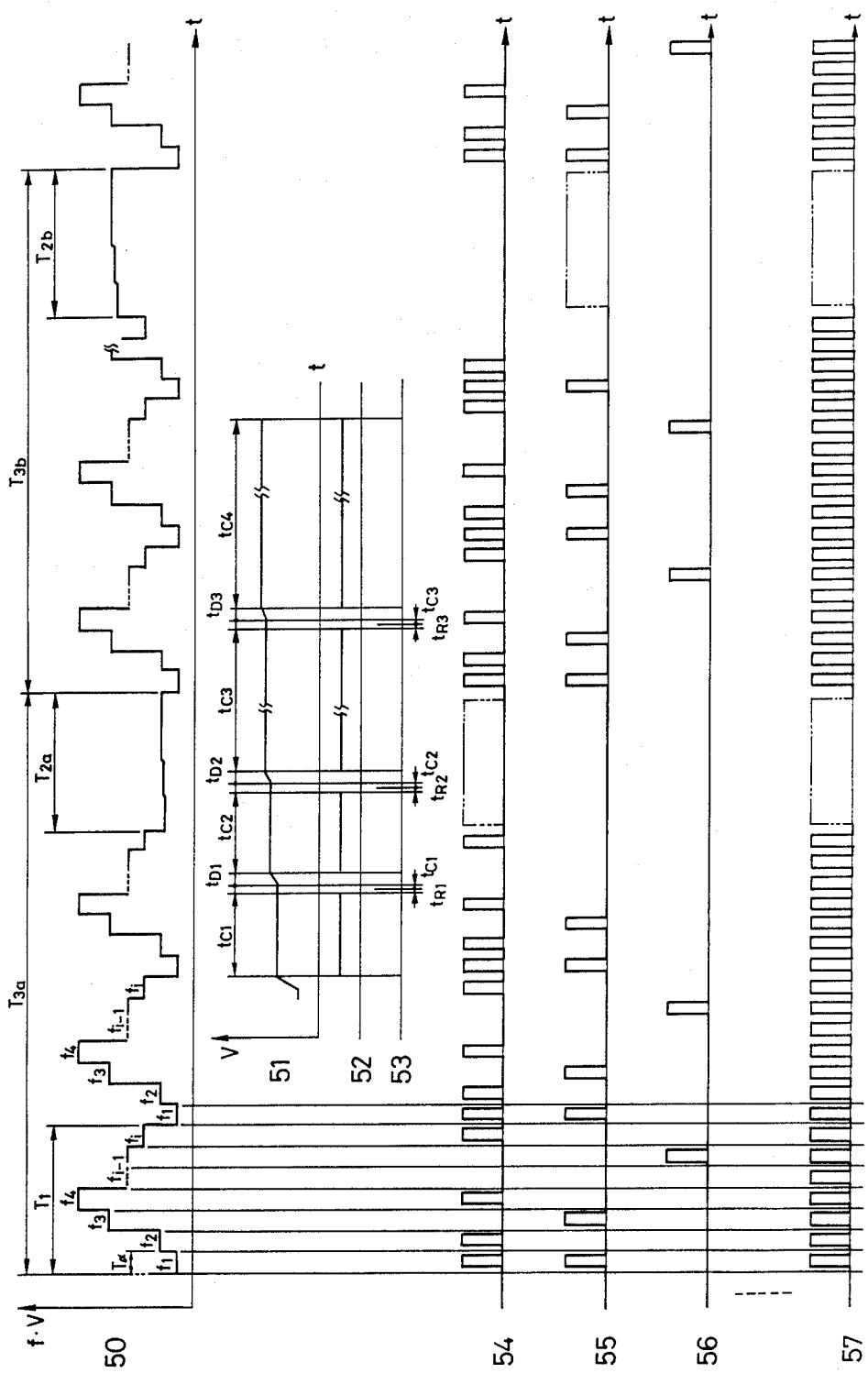
FIG. 5 is a timing track used for explaining the operation of the jamming signal generating system of FIG. 4.

FIG. 5 is a timing chart used for explaining the operations of the jamming signal generating system of the invention. In FIG. 5, reference numeral 50 shows a graph of the voltage versus time relationship of the output of the D/A 39 used for controlling the VCO 40, time being represented on the abscissa and the amplitude of the voltage applied to the VCO or, equivalently, the frequency generated by the VCO, on the ordinant. It is assumed that the number of channels to be scrambled by the jamming signal is i, that the jamming signal is applied to each of the i channels during a period of time $T_0$, and that the total time required for applying the jamming signal to all i channels is $T_1$. Further, $T_{2a}$ and $T_{2b}$ represent frequency correction periods. Each of the periods $T_{2a}$ and $T_{2b}$ is expanded in the diagram designated by 51. A diagram designated at 52 shows a state in which the counter 35 is controlled by the microcomputer 28 in the manner described above with reference to FIGS. 2 and 3. In the diagrams 52 and 53, the counter enabling/disabling signal 33 and the counter reset signal 32, respectively, are shown. Referring to the diagram 51 in FIG. 5, $t_{c1}$, $t_2$, $t_{c3}$ and $t_{c4}$ indicate the counting times required for the counting operations of the frequency counter 35; $t_{r1}$, $t_{r2}$ and $t_{r3}$ represent reading times required for reading the count results by the microcomputer 28; $t_{r1}$, $t_{r2}$ and $t_{r3}$ represent the reset times of the counter 35; and $t_{D1}$, $t_{D2}$ and $t_{D3}$ represent the conversion times required by the D/A converter 39.

Further in FIG. 5, diagrams 54, 55, 56 and 57 show the control timing for the RF switches 43a to 43f. In each of the diagrams 54 to 57, H and L designate the opened and closed states, respectively, of the RF switches. For example, for a subscriber for which the jamming signal is applied in accordance with the timing indicated in the diagram 54, each of channels at frequencies $f_1$, $f_2$, $f_4$ and $f_i$ is scrambled by the jamming signal, while for another subscriber for which the jamming signal is produced as shown in the diagram 55, the channels at frequencies $f_1$ and $f_3$ are scrambled by the jamming signal.

Figure 6:
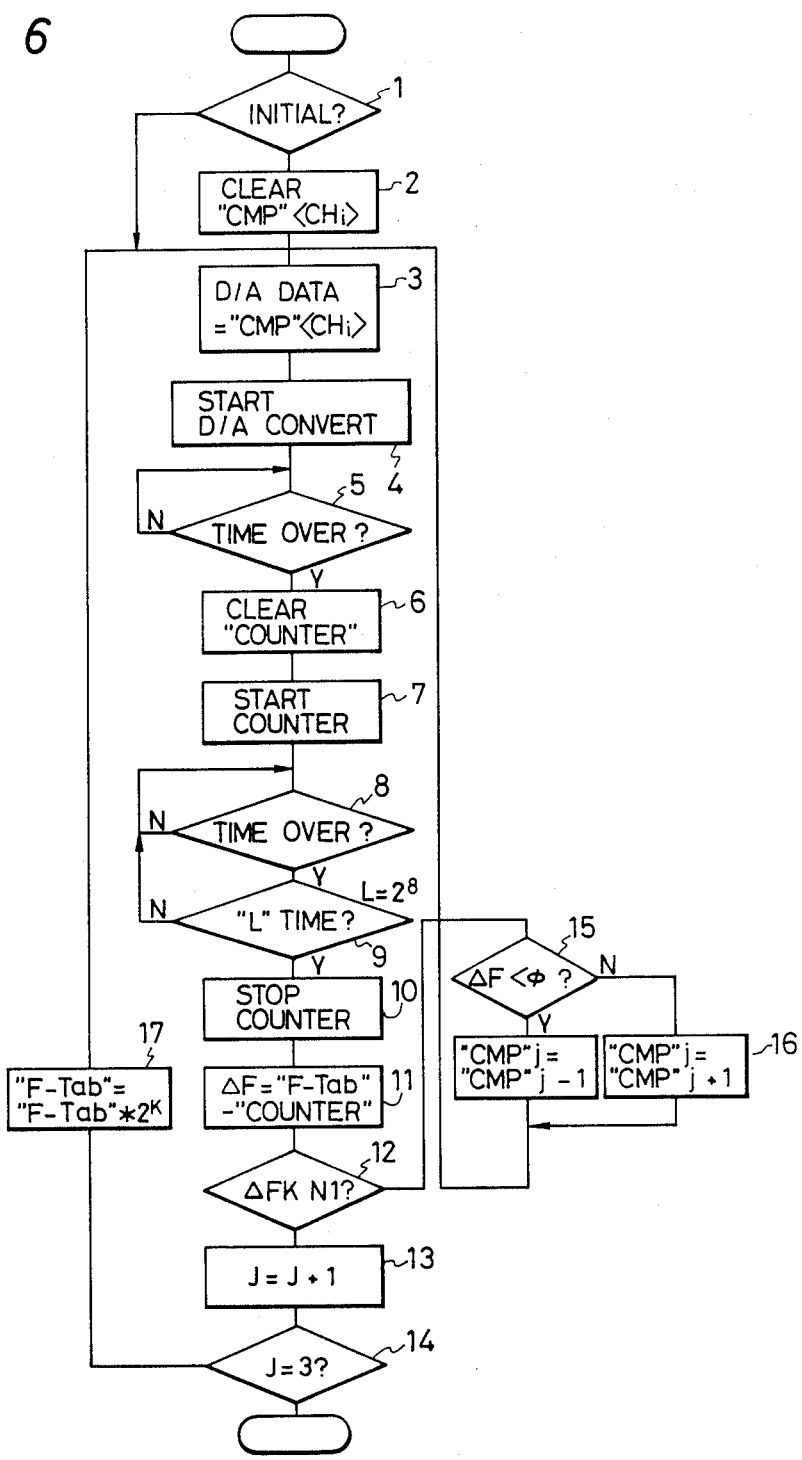
FIG. 6 is a flowchart detailing the way in which the jamming signal is controlled in accordance with outputs of a microcomputer.

FIG. 6 is a flowchart showing the frequency correction operations performed by the microcomputer 28, which represents another specific feature of the present invention. FIG. 7 shows memory maps A and B of the ROM 29 and the ROM 30, and are used for explaining the control system in accordance with the present invention, which effects control with the microcomputer 28 on the basis of data representing the contract conditions for the various subscribers.

The operation of the embodiments of the invention discussed above will now be described in more detail.

First, with reference to FIG. 2 showing the construction of the distributors 19a and 19b of FIG. 1, in communication of polling data from the center, when an address stored in advance and the polling address coincide, the data than present is received and employed to indicate which channels can be viewed by which subscribers. For such data communications, usually FSK (frequency-shift keying) modulation techniques are employed in an otherwise empty frequency band of the CATV system, usually in the vicinity of 100 MHz. The modem 27 demodulates the data communication signals. When coincidence has been detected, the microcomputer 28 reads the data and stores the contract information contained therein in the ROM 29. The ROM 29 may be a mechanical storage element employing switches or the like, a semiconductor storage device, or any other available and suitable type of storage device. The memory map A of FIG. 7 shows, by way of example, subscriber addresses $ADR_1$ to $ADR_i$ stored therein. The memory map B shows polling data CH-$E/D_1$ to CH-$E/D_i$ stored therein, this data indicating which channels are allowed for viewing by which subscribers.

In the ROM 29, there is further stored frequency arrangement data values $f_{1\text{-}count}$ to $f_{j\text{-}count}$ stored in the memory map A. The microcomputer 28 reads out one of the frequency arrangement data values from the memory map A of FIG. 7, with the values read out being selected on the basis of the polling data in correspondence with a reception-controlled channel, that is, for a channel carrying a chargeable program. The read-out frequency arrangement data is applied to the D/A converter 39. The data applied to the D/A converter 39 is changed at a predetermined rate, as shown by the diagram 50 in FIG. 5, so that a jamming signal is generated on a time-divisional basis for all chargeable channels. The microcomputer 28 controls the states of the RF switches 43a to 43f in response to the reception controlling data CH-$D/D_1$ to CH-$E/D_i$ stored in the RAM 30.

Assuming that the RF switches 43a, 43b, 43c and 43f correspond to the subscribers corresponding to the diagrams 54, 55, 56 and 57, when the output of the D/A converter 39 causes the VCO 40 to generate the jamming frequency $f_1$, the subscribers 54, 55 and 57 are inhibited from receiving the channel at the frequency $f_1$. That is, the RF switches 43a, 43b and 43f, corresponding to the subscribers 54, 55 and 57, respectively, are closed, thereby superimposing the jamming signal upon the designated channel during the period of time $T_0$. For the subsequent period of time $T_0$, the channel at the frequency $f_2$ is jammed. As indicated in FIG. 5, during this subsequent period, the subscribers 54 and 57 are prevented from receiving the channel at the frequency $f_2$. For this purpose, the RF switches 43a and 43f, corresponding to the subscribers 54 and 57, respectively, are closed. In general, each of the RF switches 43a to 43f should be capable of switching signals in the CATV band of 50 to 450 MHz at a high speed. For this purpose, an analog switch, such as one implemented with an FET, a high-frequency transistor, a PIP diode, or the like may be used.

The jamming signal generation period $t_1$ indicated in FIG. 5 should be selected to be an integer multiple of the horizontal scanning period of one of the CATV signals.

As will be readily understood from the foregoing description, the shorter the jamming signal generation period $T_1$, the better the jamming effect will be. On the other hand, if an improvement in the jamming effect is not needed, the number of chargeable channels which can be controlled can be increased.

In order to shorten the time period $T_1$, it is necessary to reduce the jamming signal generation time $T_0$, the RF switch operating time, and the response time of both the VCO 40 and the D/A converter 39.

Next, a description will be provided regarding the control technique for the VCO 40 for generating the jamming signal, which is another important feature of the present invention. Frequency control for the VCO 40 is generally formed by controlling the voltage applied across a varistor diode. However, the frequency versus voltage characteristics of individual varistor diodes may vary widely, and further these characteristics can vary strongly as a function of temperature. Hence, varistor diodes, as are generally employed in conventional circuits, are generally unsuitable. It is to be further noted that the best jamming effect can be obtained if the jamming signal frequency is set to a value within the range of $f_v \pm 500$ KHz, where $f_v$ is the video carrier frequency of a given CATV channel.

In accordance with the invention, frequency control is achieved in the following manner:

(1) In the initial state, a selected one of the values of $f_{1\text{-}count}$ to $f_{j\text{-}count}$ is read out of the ROM 29, and the data thus obtained is multiplied by the data conversion coefficient $D/A_{con}$ of the D/A converter 39, as shown in the memory map A of FIG. 7. This product is applied to the D/A converter 39.

(2) Next, the counter 35 is enabled in response to the control signal 33 so as to start its counting operation.

(3) After the counter 35 has operated for a predetermined period of time, the counter 35 is stopped, and the value of the count reached in that period of time is taken as a measure of the frequency of the signal generated at the output of the VCO 40. It is necessary to perform start/stop control of the counter 35 so that the counter performs its counting operation for this predetermined period of time. The predetermined period of time may be controlled in accordance with a clock signal provided externally, or it may be determined by an internal command/execution step in the microcomputer.

(4) The difference between a selected frequency data value $f_{1\text{-}count}$ to $f_{i\text{-}count}$ and the measured frequency $f_0$ is obtained as the frequency difference.

(5) By increasing/decreasing the data value applied to the D/A converter 39, the steps (1) to (4) are repeatedly carried out until a different value $f_{k\text{-}count} - f_0$ occurs within a predetermined error range, wherein k represents a selected channel.

(6) The above steps are performed for each of the channels designated as chargeable channels. Finally, all of the data of the D/A converter 39 is stored in the RAM 30 as data values $CMP_{iM}$ to $CMP_{kL}$, wherein M and L represent the output $CMP_{iM}$ and $CMP_{iL}$ of the D/A converter 39 corresponding to the upper and lower bit sides thereof.

Accordingly, data correction of the D/A converter 39 in the initial state is performed. During the reception control operations for a chargeable program, it is necessary to correct the values $CMP_{iM}$ to $CMP_{kL}$ at predetermined intervals in order to suppress frequency drift.

The periods $T_{2a}$ and $T_{2b}$ in the diagram 50 of FIG. 5 represent the correction period. In the diagram 51, each of the correction periods $T_{2a}$ and $T_{2b}$ is indicated in detail. For example, in the case where data correction for ten jammed channels is to be performed, correction for each jammed channel is performed every six minutes. If correction is performed within periods of hundreds of milliseconds, the data correction will scarcely affect the scrambling results.

Referring to FIG. 4, a practical operation will be described by way of example. It is assumed that the D/A converter has a capacitor of 16 bits as provided by the D/A converter units 39a and 39b. It is further assumed that the divider (prescaler) 37 has a scaling or dividing ratio of 1/64, the counter 35 has a capacity of 16 bits, an interrupt signal is applied to the microcomputer 28 when the counter 35 produces a carry, and counting is performed in accordance with the software of the microcomputer 28. The VCO 40 generates a signal having a frequency in the UHF band in order to cover the 50 to 450 MHz frequency range; downward frequency conversion is employed. For example, the VCO 40 generates a signal having a frequency in a range of (50 to 450 MHz)+600 MHz, and the frequency of this signal is downwardly converted to a signal having a frequency within a range of (50 to 450 MHz)+600 MHz−600 MHz. Accordingly, the input frequency to the divider 37 is in a range of 650 to 1,050 MHz, and the input frequency to the counter 35 is in the range of 10.156 to 16.406 MHz. Further, assuming that the counting period of the counter 35 for the counter to generate a carry (for an input clock in a range of 0.0397 to 0.064 MHz) is 1 millisecond, a count value of 10.126k to 16.406k will be reached, and an accuracy of 13 bits or more is provided. On the other hand, if the period is set to be 2 milliseconds, it is possible to measure the frequency with an accuracy of 14 bits or more.

The measured value of frequency can be expressed by:

$$CV_s \times 2^8 + CV_c \times 64/1 \text{ msec},$$

where $CV_s$ and $CV_c$ represent the count value produced by the microcomputer software and the count value produced by the counter, respectively.

Referring to FIG. 4, the operation of the arrangement shown therein will be further described. In FIG. 4, the CMOS logic gates 39a-1 to 39a-4 correspond to the CMOS logic gates 39b-1 to 39b-4, respectively; the resistors 39a-5 to 39a-9 are the same as the resistors 39b-5 to 39b-9; and the operational amplifier 39a-10 is the same as the operational amplifier 39b-10. Accordingly, similar D/A converter units 39a and 39b are provided. Assuming the resistance value of the resistor 39a-5 is represented by R, and the resistor 39a-6, 39a-7 and 39a-8 have resistance values of $2 \times R$, $2^2 \times R$ and $2^7 \times R$, respectively, the D/A converter unit 39a is implemented in the form of a simple eight-bit D/A converter. The resistance value of the resistor 39a-9, which determines the conversion gain, can be selected as desired.

In the D/A converter unit 39a, the current drive capabilities of the CMOS gates 39a-1 to 39a-4 are employed. That is, the logic level H or L signals passing through the CMOS gates 39a-1 to 39a-4 are divided by current dividers constituted by the respective resistors 39a-5 to 39a-9, and the current is converted into a voltage by the current-to-voltage converting operational amplifier 39a-10. The arrangement of the D/A converter unit 39b is substantially similar to that of the D/A converter unit 39a, except that the attenuator 39b-11 is provided so that the maximum bit output of the operational amplifier 39b-10 is equal to half the minimum bit output of the operational amplifier 39a-10. Accordingly, a simple sixteen-bit D/A converter is realized inexpensively.

FIG. 6 shows a flowchart depicting the operations required for calculating the frequency controlling data for the D/A converter in the initial state and for correcting the same during the controlling operations. This flowchart shows the process for one jammed channel. It is of course necessary to repeat the process for every channel to be jammed.

In step 1, a determination is made as to whether the D/A data is in the initial state. If NO, the operation is shifted to step 2, while if YES the operation is jumped to step 3.

In step 2, the correction D/A data $CMP_i$ is initialized or set to zero. For example, the frequency data $F_{count-k}$ of the channel k is multiplied by the data conversion coefficient $D/A_{con}$ of the D/A converter so as to force the D/A data to be DAD.

In step 3, a value $DAD + CMP_i$ is set as the correction D/A data.

In step 4, the correction D/A data is inputted to the D/A converter.

In step 5, waiting is carried out until the D/A conversion operation has been completed.

In step 6, the counter 35 is reset.

In step 7, the counter 35 is enabled to begin its counting operation.

In step 8, the frequency count is carried out for the predetermined period of time.

In step 9, a determination is made as to whether the operation has been carried out on the upper eight bits of the data. If YES, the operation is shifted to step 10, while if NO, the operation returns to step 8. In this embodiment, it is sufficient for the time taken to execute step 8 to be about 0.5 msec, while on the other hand, it is sufficient for the time period allowed for step 9 to be completed that is, for the lower-bits side D/A correction, to be $2^8 \times 0.5$ msec = 128 msec.

In step 10, the counter is disabled from further counting.

In step 11, a frequency difference $\Delta F$ between the frequency data $f_{i-count}$ in the ROM and the actually measured frequency is obtained.

In step 12, a determination is made as to whether the absolute value of the frequency difference $\Delta F$ is larger than predetermined value $N_1$. If YES, the operation is shifted to step 15, while if NO, the operation is branched to step 13.

If the frequency difference $\Delta F$ is positive, that is, if the actually generated frequency is lower than the reference frequency, the operation shifts to step 16. In step 16, the correction data $CMP_{ij}$ is increased by 1, while in the case the frequency difference F is negative, the correction data is decremented by 1 and the operation jumps to step 13.

In step 13, if the upper bit side correction has been completed, a loop parameter J is incremented by 1, and when the parameter becomes 3, it is determined further that the lower bit side correction has been completed, whereupon this routine is ended.

The above operations are carried out for all channels.

A description has been given relating to the operation of the D/A converter 39 and the frequency correction thereof with reference, by example, to FIGS. 4 to 6.

In FIG. 3, an embodiment is shown which, as described above, is provided with the additional function of causing the jammed carrier level to follow level fluctuations of the CATV signals so as to maintain a predetermined ratio between the CATV signal level and the jamming signal level. The arrangement of FIG. 3 is the same as that of level. The arrangement of FIG. 3 is the same as that of FIG. 2 generally, and hence a further description will be given only of the VCO section 40 with respect to this additional function.

In FIG. 3, the input side LPF 40A eliminates frequency components other than those fall in the CATV signal band, that is, those in a frequency range of 50 to 450 MHz. The so-obtained CATV signal and the output signal from the VCO unit 40H, amplified by the amplifier 40I, are mixed by the first mixer 40B and the intermediate frequency component thereby produced is extracted with the intermediate frequency BPFs 40C and 40E and the intermediate frequency amplifier 40D. That is, the VCO unit 40H is controlled in such a manner that the output signal thereof satisfies the relation $f_{Li}=f_{vi}+f_{ji}$, where $f_{Li}$, $F_{vi}$ and $f_{ji}$ represent the frequency of the video carrier in the signal i to be jammed (obtained from the LPF 40A), the intermediate frequency supplied to the second mixer 40F, and the frequency of the output signal of the VCO unit 40H.

The intermediate frequency signal fLi and the oscillation frequency signal $f_{ji}$ are mixed with each other by the second mixer 40f, and the frequency component $f_{vi}=f_{Li}-f_{ji}$ is extracted via the BPF 40G. The video carrier frequency $f_v$ of the CATV signal in the channel to be jammed is set with a predetermined gain. Similarly, the audio carrier signal at the frequency $f_a$ is set to a predetermined gain. Using the thus-obtained video carrier signal and audio carrier signal as the signals to be jammed, both the picture and the sound are effectively blocked.

As is apparent from the foregoing description, according to the present invention, it is made possible to provide time-division generated jamming signals at a high speed with a simple circuit arrangement. Moreover, the following specific advantages are obtained:

(1) As an improvement over the conventional frequency control system in which a VCO is used together with a PLL, it is possible to perform frequency control at a high speed because it is unnecessary to allow for time for lock-in of the PLL and the like.

(2) Since the correction of the VCO oscillation frequency is performed by a D/A converter by means of software and a microcomputer, a highly accurate D/A converter is not required; that is, a very simple D/A converter can be employed, thereby reducing the cost of the system.

(3) It is possible to increase the number of channels which can be jammed and to improve the jamming effect simultaneously because frequency control can be performed at a high speed.

(4) The apparatus is economical as a whole because of its simple circuit arrangement.

I claim:

1. A CATV reception control apparatus comprising:
a branching device for branching a CATV signal from a transmission line to a plurality of subscriber ports;
a plurality of directional couplers for applying jamming signals to said subscriber ports on a time-division basis;
a plurality of RF switches for controlling the application of said jamming signal to said directional couplers;
a single VCO for generating a succession of different frequency jamming signals to be supplied to said RF switches;
a D/A converter responsive to digital input data for generating a voltage for controlling a frequency of an output of said VCO;
counter means for periodically counting cycles of an output of said VCO during a predetermined period of time; and
microcomputer means for controlling operations of said RF switches in response to program control data received by said microcompuer means from a center over said transmission line and for reading out a count value produced by said counter and supplying said D/A converter with said digital input data.

2. The CATV reception controlling apparatus of claim 1, further comprising frequency divider means coupled between said VCO and said microcomputer means.

3. The CATV reception controlling apparatus of claim 1, further comprising means for controlling an amplitude of said jamming signal so that said amplitude of said jamming signal is in a fixed predetermined ratio with an amplitude of said CATV signal.

4. The CATV reception controlling apparatus of 3, wherein said controlling means comprises: a low-pass filter receiving said CATV signal, an amplifier receiving as an input an output of said VCO, a first mixer receiving as inputs an output of said low-pass filter and an output of said amplifier, amplifying and first bandpass filtering means coupled in series with an output of said first mixer, a second mixer receiving as inputs an output of said amplifying and first bandpass filtering means and said output of said amplifier, and second bandpass filtering means coupled in series with an output of said second mixer.

5. The CATV reception controlling apparatus of claim 1, wherein D/A converter comprises: a plurality of CMOS gates, each of said CMOS gates receiving as an input a respective digital bit input to said D/A converter; a resistor coupled in series with the output of each of said CMOS gates; and first and second summing means, said CMOS gates and the respective ones of said resistors being arranged in first and second groups corresponding to respective upper and lower halves of the digital input to said D/A converter, and said first and second summing means having inputs coupled to ones of said resistors in respective ones of said first and second groups.

6. The CATV reception controlling apparatus of claim 1, wherin said microcomputer means includes:
generating means for generating a plurality of digital control signals corresponding to desired VCO output signal frequencies;
storing means for storing the digital control signals;
means for retrieving said digital control signals and for providing said digital control signals to said D/A converter as said digital input data during a time Period other than said predetermined time period; and
adjusting means for periodically adjusting said digital control signal in accordance with the number of cycles counted by said counter.

7. The CATV reception controlling apparatus of claim 1, wherein said microcomputer means includes:
generating means for generating a digital control signal corresponding to a desired VCO output signal frequency and for providing said digital control signal to said D/A converter during said predetermined period of time;
adjusting means for adjusting said digital control signal in accordance with the number of cycles counted by said counter;
storing means for storing the adjusted digital control signal; and
means for retrieving said adjusted digital control signal and for providing said adjusted digital control signal to said D/A converter as said digital input data during a time period subsequent to said predetermined time period.

8. A CATV reception control apparatus as claimed in claim 1, wherein each said different frequency jamming signal is applied to a direction coupler during a respective jamming interval and is generated for a respective interval in accordance with digital input data provided to said D/A converter having a constant value over each jamming interval, said microcomputer means supplying said D/A converter with a first digital input data corresponding to a first one of said jamming signals and controlling operations of said R/F switches to apply said first one of said jamming signals to at least one of said directional couplers during a first jamming interval corresponding to said first jamming signal, said microcomputer means, during a time subsequent to said first jamming interval, correcting a digital input data value in accordance with the read-out count value corresponding to said first jamming signal generated during said first jamming interval, and supplying said D/A converter with the corrected digital input data during a subsequent jamming interval.

* * * * *